US 6,996,746 B2

(12) United States Patent
Shukla et al.

(10) Patent No.: US 6,996,746 B2
(45) Date of Patent: *Feb. 7, 2006

(54) APPARATUS AND METHOD TO HANDLE POWER SUPPLY FAILURES FOR A PERIPHERAL DEVICE

(75) Inventors: Arti Shukla, Eagle, ID (US); Steven C. Johnson, Eagle, ID (US); Shane Konsella, Boise, ID (US); Kwesi E Abraham, Boise, ID (US); Jessop Dennis, Boise, ID (US); Michael L. Rishel, Boise, ID (US); Kurt R Bengtson, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 249 days.

This patent is subject to a terminal disclaimer.

(21) Appl. No.: 10/690,188

(22) Filed: Oct. 21, 2003

(65) Prior Publication Data

US 2004/0084971 A1 May 6, 2004

Related U.S. Application Data

(63) Continuation of application No. 09/713,100, filed on Nov. 14, 2000, now Pat. No. 6,694,453.

(51) Int. Cl.
*G06F 11/00* (2006.01)
*H02H 3/00* (2006.01)

(52) U.S. Cl. .................... 714/24; 700/293; 713/340; 714/44; 307/64; 307/66

(58) Field of Classification Search ............. 700/21, 700/293; 713/340; 714/5, 24, 44; 307/64, 307/66
See application file for complete search history.

(56) References Cited

U.S. PATENT DOCUMENTS

| | | | |
|---|---|---|---|
| 4,399,538 A | | 8/1983 | Chalokian et al. |
| 4,458,307 A | * | 7/1984 | McAnlis et al. .............. 714/22 |
| 4,611,289 A | | 9/1986 | Coppola |
| 5,371,873 A | | 12/1994 | Niwa |
| 5,784,628 A | | 7/1998 | Reneris |
| 5,791,790 A | | 8/1998 | Bender et al. |
| 5,845,142 A | * | 12/1998 | Hayasaka ................... 713/340 |
| 5,920,728 A | * | 7/1999 | Hallowell et al. .......... 713/340 |
| 5,978,922 A | * | 11/1999 | Arai et al. .................. 713/323 |
| 6,304,981 B1 | | 10/2001 | Spears et al. |
| 6,314,502 B1 | | 11/2001 | Piersol |
| 6,314,528 B1 | | 11/2001 | Kim |
| 6,353,894 B1 | * | 3/2002 | Pione ........................ 713/340 |
| 6,487,521 B1 | | 11/2002 | Carney |
| 6,516,440 B1 | | 2/2003 | Teradaira |
| 6,694,453 B1 | * | 2/2004 | Shukla et al. ................ 714/24 |

\* cited by examiner

Primary Examiner—Anthony Knight

(57) ABSTRACT

One embodiment of the invention is directed to a data processing system that includes an electrical detection circuit to determine whether the electrical power is going from "on" to "off," or changing from "off" to "on;" a peripheral device, including a processor to calculate the amount of electrical energy required for the peripheral device to perform a task; a task queue for the peripheral device that can be read to find a task if the electrical power is going from "on" to "off;" and a non-volatile memory, including a task queue to store data describing the task if insufficient electrical energy remains available to the peripheral device to complete the task.

18 Claims, 7 Drawing Sheets

US 6,996,746 B2

APPARATUS AND METHOD TO HANDLE POWER SUPPLY FAILURES FOR A PERIPHERAL DEVICE

CROSS REFERENCE TO RELATED APPLICATIONS

This application is a continuation of application Ser. No. 09/713,100 filed Nov. 14, 2000, now U.S. Pat. No. 6,694,453, titled Apparatus and Method to Handle Power Supply Failures for a Peripheral Device.

BACKGROUND OF THE INVENTION

1. Field of the Invention

This invention relates generally to scheduling the tasks for a peripheral device in a data processing system during a power failure, and more specifically to scheduling the completion of tasks for a peripheral device during a power failure in a data processing system and after power is restored.

2. Description of the Prior Art

In many data processing systems (e.g., computer systems, programmable electronic systems, telecommunication switching systems, control systems, and so forth) a power failure may occur while a peripheral device is performing one or more tasks scheduled for that peripheral device.

FIG. 1 illustrates a prior art approach for handling power failures in a data processing system 100. Data processing system 100 includes an uninterruptible power supply (UPS) 106 that can briefly supply all the electrical power required to operate the core 102 of the data processing system and a peripheral device 104 (e.g., a printer or other I/O device). The UPS may or may not provide sufficient time for peripheral 104 to perform one or more scheduled tasks, such as printing one or more files. If the UPS does not provide sufficient time, then the tasks are not completed and are possibly deleted from the task queue for the peripheral. Furthermore, a larger data processing system requires a larger and more expensive UPS with a larger power capacity. It is often impractical to buy a UPS that can supply an entire data processing system, because the price and size of a higher capacity UPS rapidly increases for higher power capacities.

It would be desirable to have the capability to reliably insure that the occurrence of a power failure during the operation of a peripheral device in a data processing system will not prevent the completion of each scheduled peripheral task. It would also be desirable to provide an apparatus and method to handle power failures and the restoration of power without requiring a large and expensive UPS with the power capacity to supply power for an entire data processing system.

SUMMARY OF THE INVENTION

The invention provides the capability to help insure that the occurrence of a power failure during the operation of a peripheral device in a data processing system will not prevent the completion of each scheduled peripheral task.

The invention also provides an apparatus and method to handle power failures and the restoration of power without requiring a large and very expensive uninterruptible power supply with the capacity to supply power for an entire data processing system.

A first aspect of the invention is directed to a method to handle a power failure during the performance of a task by a peripheral device, wherein the peripheral device receives electrical power with an "on" state and an "off" state from a power supply, and the peripheral device is part of a data processing system which also contains a non-volatile memory. The method includes monitoring the power supply to determine whether the electrical power is changing from the "on" state to the "off" state, or changing from the "off" state to the "on" state; if the electrical power is changing from the "on" state to the "off" state, examining a first task queue for the peripheral device to find at least one task for the peripheral device in the first task queue; calculating the amount of electrical energy required for the task; performing the task if sufficient electrical energy remains available to the peripheral device to complete the task; and storing data describing the task in a second task queue in the non-volatile memory if insufficient electrical energy remains available to the peripheral device to complete the task.

A second aspect of the invention is directed to a data processing system that handles power failures when receiving electrical power with an "on" state and an "off" state from a power supply. The data processing system includes an electrical detection circuit for monitoring the power supply to determine whether the electrical power is changing from the "on" state to the "off" state, or changing from the "off" state to the "on" state; a peripheral device, including a processor to calculate the amount of electrical energy required for the peripheral device to perform a task; a first task queue for the peripheral device that can be read to find a task for the peripheral device if the electrical power is changing from the "on" state to the "off" state; and a non-volatile memory, including a second task queue for said peripheral device that can store data describing said task if insufficient electrical energy remains available to said peripheral device to complete said at least one task.

DETAILED DESCRIPTION OF THE PREFERRED EMBODIMENTS

This invention provides an apparatus and method for handling a power failure in a data processing system. This invention can be applied to ensuring that peripheral device tasks are either performed by the peripheral device during the power failure, or saved in non-volatile memory so that the task is completely performed by the peripheral device after power is restored to the data processing system and peripheral device.

In preferred embodiments of the invention, there is an electrical power detection circuit to monitor the power supply of the data processing system. In the more preferred embodiments, the electrical power detection circuit is in an uninterruptible power supply (UPS). In the most preferred embodiment, the UPS is inside the peripheral device that needs it (e.g., a printer or other I/O device). In alternative embodiments, there is a UPS externally connected to a peripheral device and the non-volatile memory. The most preferred embodiment of the invention uses a disk memory to provide the non-volatile memory to store the required information for a peripheral to perform a task. The task information for a peripheral, such as a printer, can be stored in Printer Description Language (PDL), a standardized file format (e.g., TIFF, JPEG, and so forth), or a hardware-specific data format the peripheral understands.

Preferred embodiments of the invention use a processor in the peripheral device to calculate how much electrical energy is needed for each of set of tasks in a task queue for the peripheral device. In preferred embodiments of the invention, the electrical energy requirements for each task are calculated after a power failure is originally detected, while there is still enough electrical power available to the peripheral device to perform tasks. The calculation for a peripheral can be as simple as an estimate of the energy needed to output one page multiplied by the number of pages of output.

Figure 1:
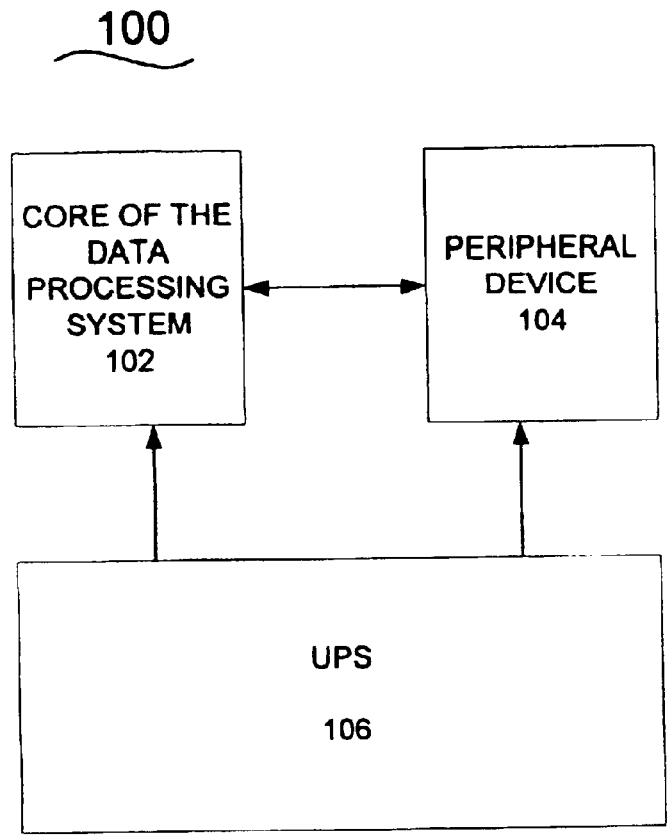
FIG. 1 illustrates a prior art approach for handling power failures in a data processing system.
Figure 2:
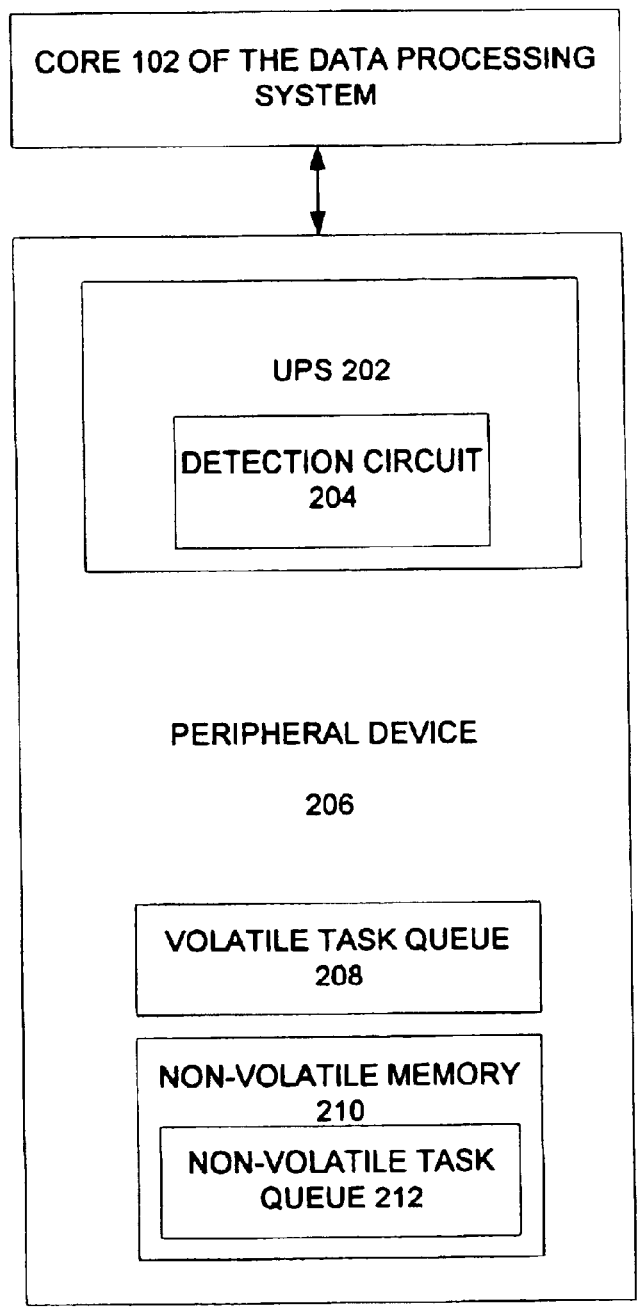
FIG. 2 illustrates one preferred embodiment of the invention for handling power failures in a data processing system.

FIG. 2 illustrates one preferred embodiment of the invention for handling power failures in a data processing system 200. The UPS 202 and the electrical power detection circuit 204 within the UPS 202 reside inside the peripheral device 206. In one preferred embodiment of the invention, the volatile task queue 208 and the non-volatile memory 210 that contains the non-volatile memory task queue 212 reside inside the peripheral device 206. The memory cells in the volatile task queue for the peripheral device are typically implemented with flip-flops, latches, or random access memory. The memory cells in the non-volatile memory task queue 212 for the peripheral device 206 can be implemented with disk memory, magneto-optic memory, programmable memory, such as flash memory, or a battery-supported memory.

Figure 3:
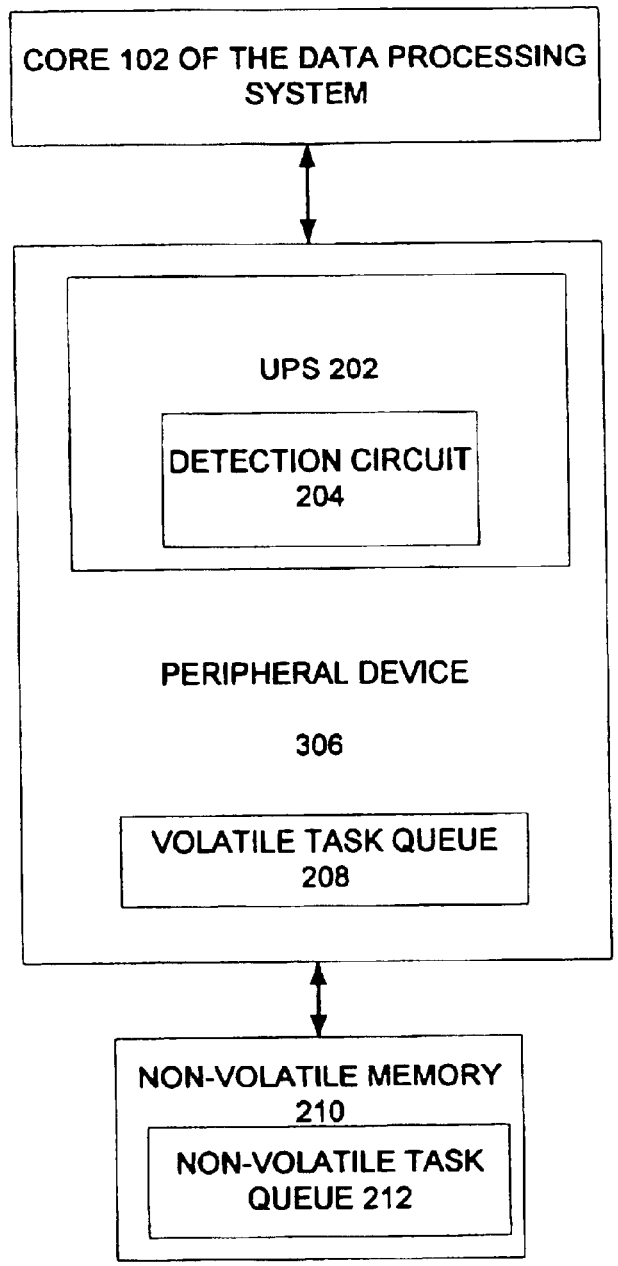
FIG. 3 illustrates an alternative preferred embodiment of the invention for handling power failures in a data processing system.

FIG. 3 illustrates an alternative preferred embodiment of the invention for handling power failures in a data processing system 300. The UPS 202 and the electrical power detection circuit 204 within the UPS 202 reside inside the peripheral device 306. The volatile task queue 208 resides inside the peripheral device 306. The non-volatile memory (e.g., disk memory, flash memory) 210 that contains the non-volatile memory task queue 212 resides outside the peripheral device 306.

Figure 4:
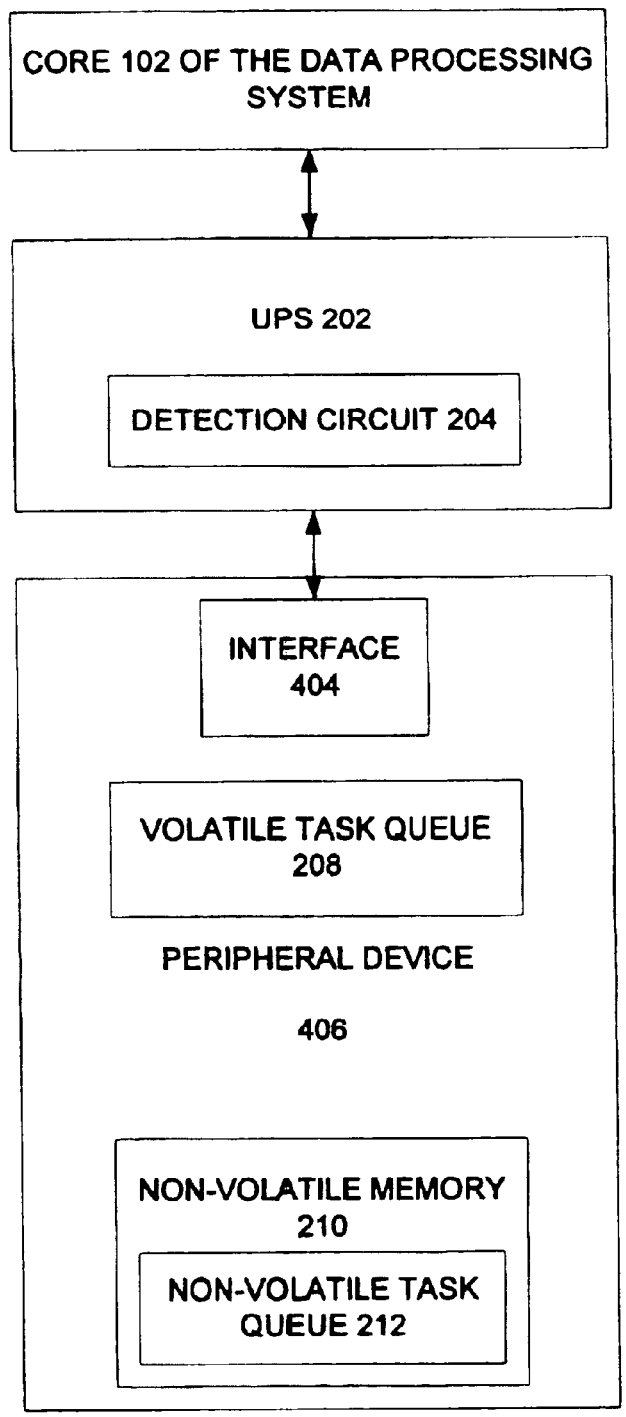
FIG. 4 illustrates an alternative preferred embodiment of the invention shown in FIG. 3 for handling power failures in a data processing system.

FIG. 4 illustrates an alternative preferred embodiment of the invention shown in FIG. 3 for handling power failures in a data processing system 400. The UPS 202 and the electrical power detection circuit 204 within the UPS 202 are outside the peripheral device 406, which contains an interface 404 to the UPS 202. In this embodiment of the invention, the volatile task queue 208 and the non-volatile memory 210 (e.g., disk memory, flash memory) that contains the non-volatile memory task queue 212 reside inside the peripheral device 406.

Figure 5:
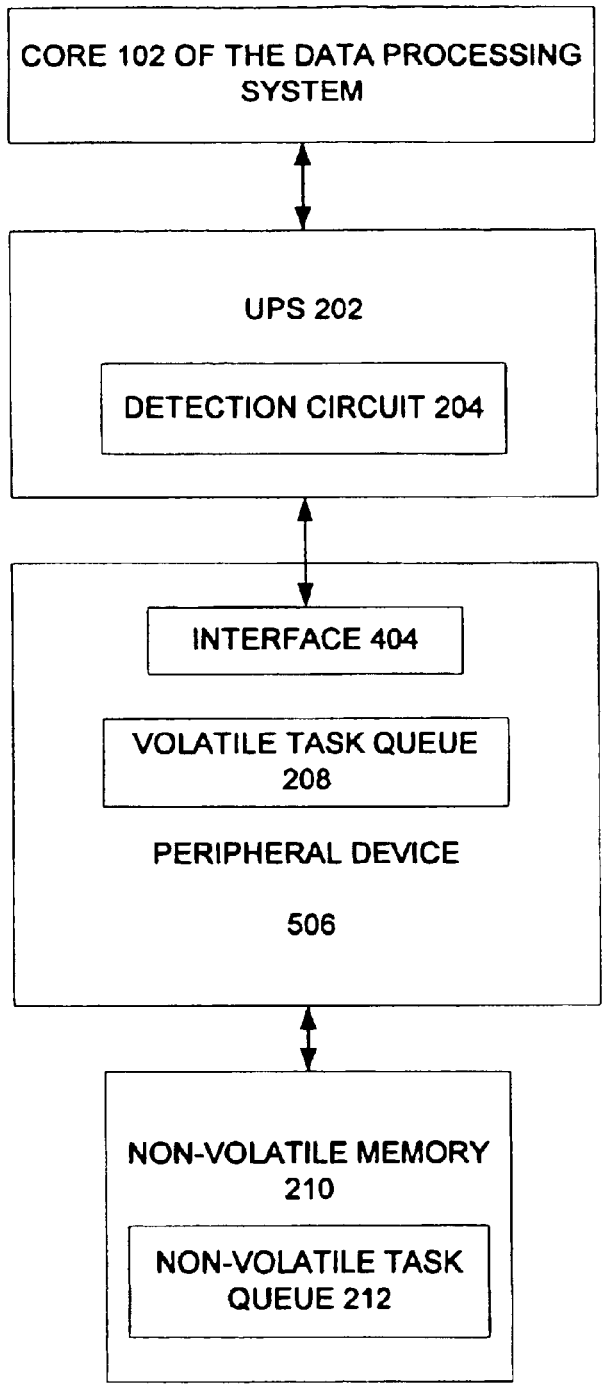
FIG. 5 illustrates an alternative preferred embodiment of the invention shown in FIG. 4 for handling power failures in a data processing system.

FIG. 5 illustrates an alternative preferred embodiment of the invention shown in FIG. 4 for handling power failures in a data processing system 500. The UPS 202 and the electrical power detection circuit 204 within the UPS 202 are outside the peripheral device 506, which contains an interface 404 to the UPS 202. In this embodiment of the invention, the volatile task queue 208 resides inside the peripheral device 506. The non-volatile memory (e.g., disk memory, flash memory) 210 that contains the non-volatile memory task queue 212 resides outside the peripheral device 506.

Figure 6:
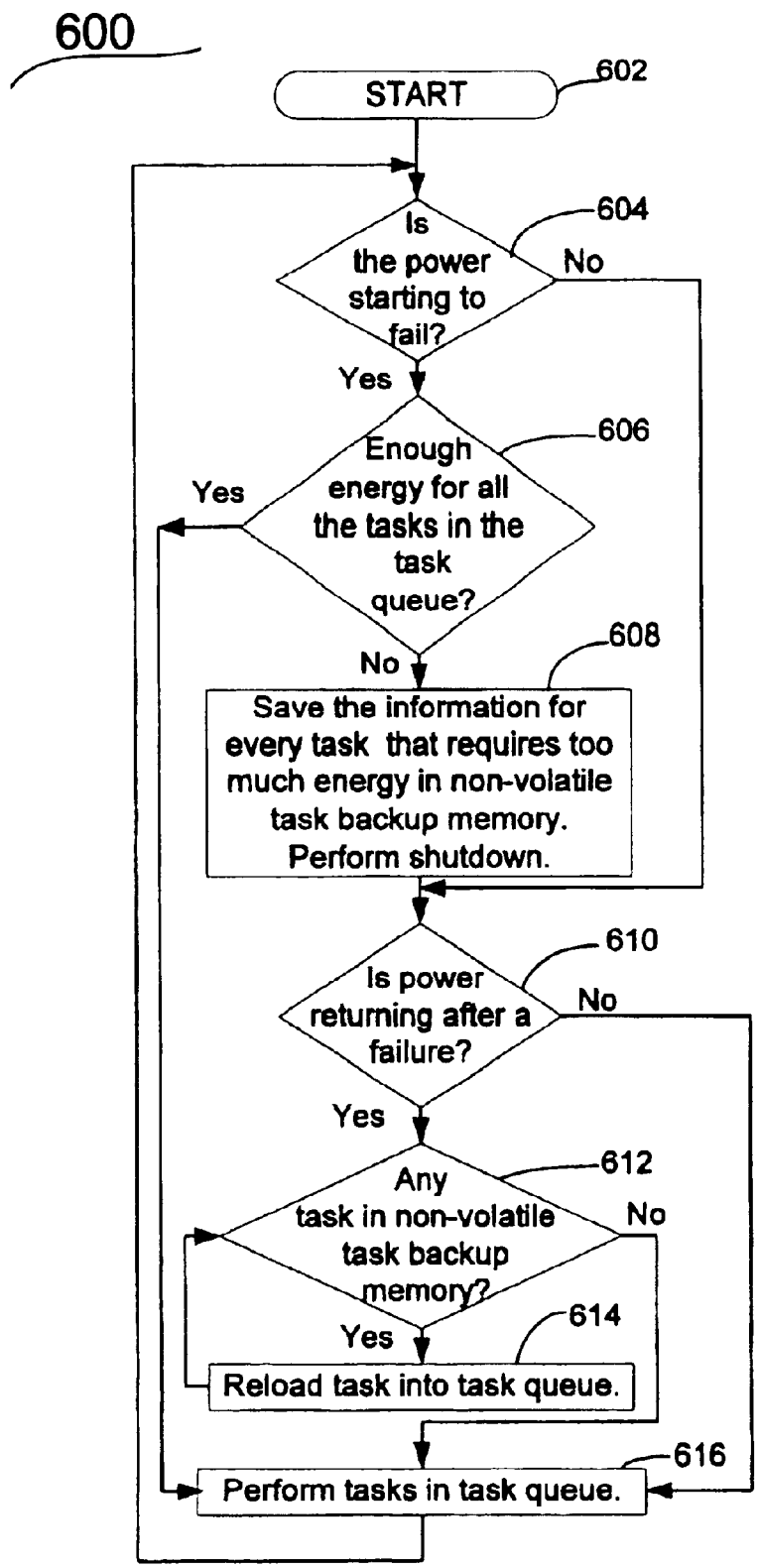
FIG. 6 shows one flow chart for a power failure handling data processing system in accordance with the most preferred embodiment of the present invention.

FIG. 6 shows one flow chart 600 for a power failure handling data processing system in accordance with the most preferred embodiment of the present invention. The method starts in operation 602, which is followed by operation 604. In operation 604, the power state is tested to determine if the power is starting to fail. If the power is fail, then operation 606 is next, where a test is performed to determine if there is enough energy for the peripheral device to perform all the tasks in the task queue (e.g., print out files). If the test in operation 606 determines that there is enough electrical energy to perform all the tasks in the task queue, then the tasks are performed in operation 616. However, if the test in operation 606 determines there is not enough electrical energy for the tasks, then operation 608 is next, where all the information required for performing the tasks is saved in a non-volatile memory (e.g., a disk memory, a magneto-optical memory, a battery-supported memory, or programmable memory, such as flash memory). Then the remaining shutdown procedures are performed. Then the peripheral device waits for power. In operation 610, when power returns, a test determines if power is returning after a power failure. If the test of operation 610 determines that there was no preceding failure, then operation 616 is next, where the tasks in the task queue are performed normally. However, if the test in operation 610 determines that the power is returning after a power failure, then operation 612 is next, where a test is performed to determine if there is a task for the peripheral device stored in the non-volatile memory. If the test in operation 612 determines there are no tasks stored in the non-volatile memory for the peripheral device, then in operation 616, the tasks in the task queue are performed. However, if the test in operation 612 determines that there is a task for the peripheral device stored in the non-volatile memory, then in operation 614 the information for the task is retrieved from the non-volatile memory and transferred to the task queue for the peripheral device. Operation 612 then follows operation 614, where a test is made to determine if another task remains in the non-volatile memory task queue for the peripheral device. If there is another task remaining in the non-volatile memory, then operation 614 is repeated. If there is no other task remaining in the non-volatile memory, then operation 616 is next, where the peripheral device performs each of the tasks in the task queue. The method then returns to operation 604 to test the power.

Figure 7:
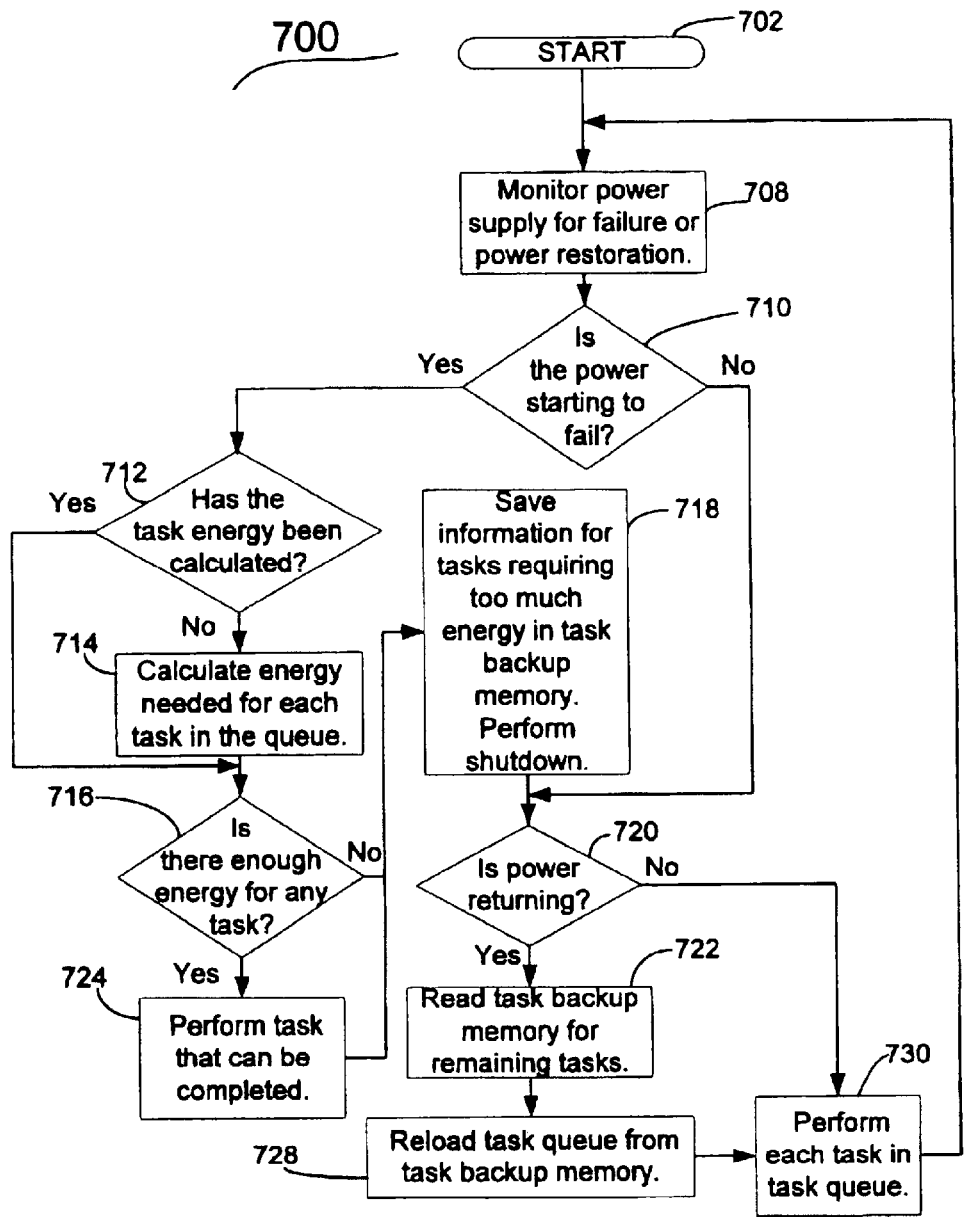
FIG. 7 shows another flow chart for an alternative embodiment of the invention, where the energy requirement for each task of a peripheral device is calculated and stored in the task queue as the task is originally entered.

FIG. 7 shows another flow chart 700 for an alternative embodiment of the invention, where the energy requirement for each task of a peripheral device is calculated and stored in the task queue as the task is originally entered. Either a peripheral device processor or the main processor can calculate the electrical energy required for a task assigned to the peripheral device. The method starts in operation 702. Operation 708 is next, where the power supply is monitored for power failure or power restoration. Operation 710 is next, where the power state is tested to determine if the power is starting to fail. If the test of operation 710 determines the power is not starting to fail, then operation 720 is next, where a test is performed to determine if the power is returning after a power failure. However, if the test of operation 710 determines that the power is starting to fail, then operation 712 is next, where a test is performed to check whether the task energy for each task in the task queue of the peripheral device was calculated before the power failure started. If the test of operation 712 determines that one or more tasks in the task queue need an energy calculation, then operation 714 is next, where the energy is calculated for the tasks in the task queue. If the test of operation 712 determines that the tasks in the task queue have their energy requirements calculated, then operation 716 is next. In operation 716 a test is performed to determine if there is enough energy for the peripheral device to perform a task (e.g., print out a file). If the test of operation 716 finds a task that can be performed before the peripheral device fails, then operation 724 is next, where that task is performed. If the test of operation 716 determines that there is not enough electrical energy for a task, then operation 718 is next, where all the information required for performing each remaining task is saved in a non-volatile memory (e.g., a disk memory, a battery-supported memory, or a flash memory). In operation 718, after all the tasks are saved in a task backup memory, the shutdown of the peripheral is performed. In operation 720, when power returns, a test is made to determine whether the power is returning after a power failure. If the test of operation 720 determines that there was no preceding power failure, then operation 730 is next, where each task in the task queue is performed normally. Then operation 708 is next, where the power is monitored. However, if the test of operation 720 determines that the power is returning after a power failure, then operation 722 is next, where the peripheral device task backup memory stored in the non-volatile memory is read for any remaining tasks. Then operation 728 is next, where the tasks found in the task backup memory are reloaded into the task queue for the peripheral device. Operation 730 is next, where each task in the task queue of the peripheral device is performed. The method then returns to operation 708, where the power supply is monitored.

One preferred embodiment uses a UPS inside the peripheral device to supply some time for performing one or more tasks during a power failure. Other preferred embodiments use an external UPS to supply electrical power to the peripheral device and to a disk drive to store the information for tasks too large to be performed by the electrical energy available to the peripheral device. If the disk memory is external to the peripheral device, preferably an external UPS supplies power to the disk memory. Other embodiments of the invention could be implemented with one UPS for the peripheral device and another UPS for the disk memory. Other embodiments could be implemented without a UPS, and depend only the electrical energy contained in the reactive impedance of the data processing system.

The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method to handle power failures during the performance of a task by a peripheral device, wherein said peripheral device receives electrical power with an "on" state and an "off" state from a power supply, and said peripheral device is part of a data processing system which also contains a non-volatile memory, said method comprising:

monitoring said power supply to determine whether said electrical power is changing from said "on" state to said "off" state, or changing from said "off" state to said "on" state; and if it is determined that said electrical power is changing from said "on" state to said "off" state,
   examining a first task queue for said peripheral device to find at least one task for said peripheral device placed in said first task queue before it is determined that said electrical power is changing from said "on" state to said "off" state;
   calculating the amount of electrical energy required for said at least one task;
   performing said at least one task if sufficient electrical energy remains available to said peripheral device to complete said at least one task; and
   storing data describing said task in a second task queue in said non-volatile memory if insufficient electrical energy remains available to said peripheral device to complete said at least one task.

2. The method of claim 1, further comprising:
searching in said second task queue in said non-volatile memory for at least one stored task if it is determined that said electrical power is changing from said "off" state to said "on" state; and if said at least one stored task is in said second task queue, starting said peripheral device, retrieving said at least one stored task from said second task queue, and performing said at least one stored task with said peripheral device.

3. The method of claim 2, further comprising starting said peripheral device if there is no stored task in said second task queue.

4. The method of claim 2, wherein said first task queue and said second task queue are one task queue in said non-volatile memory.

5. The method of claim 1, wherein said non-volatile memory includes a magnetic memory.

6. The method of claim 1, wherein said peripheral device is a printer.

7. The method of claim 1, wherein said peripheral device is an input/output (I/O) device.

8. A method to handle power failures during the performance of a task by a peripheral device, wherein said peripheral device receives electrical power with an "on" state and an "off" state from a power supply, and said peripheral device is part of a data processing system which also contains a non-volatile memory, said method comprising:

monitoring said power supply to determine whether said electrical power is changing from said "on" state to said "off" state, or changing from said "off" state to said "on" state;

if it is determined that said electrical power is changing from said "on" state to said "off" state,
   examining a first task queue for said peripheral device to find at least one task for said peripheral device placed in said first task queue before it is determined that said electrical power is changing from said "on" state to said "off" state,
   calculating the amount of electrical energy required for said at least one task,
   performing said at least one task if sufficient electrical energy remains in said peripheral device to complete said at least one task, and
   storing data describing said task in a second task queue in said non-volatile memory if insufficient electrical energy remains in the peripheral device to complete said at least one task;

if it is determined that said electrical power is changing from said "off" state to said "on" state,
  searching in said second task queue in said non-volatile memory for at least one stored task,
  starting said peripheral device, retrieving said at least one stored task from said second task queue, if said at least one stored task is in said second task queue, and
  performing said at least one stored task with said peripheral device.

9. The method of claim 8, wherein said first task queue and said second task queue are one task queue in said non-volatile memory.

10. A data processing system that handles power failures when receiving electrical power with an "on" state and an "off" state from a power supply, comprising:
  an electrical detection circuit for monitoring said power supply to determine whether said electrical power is changing from said "on" state to said "off" state, or changing from said "off" state to said "on" state;
  a peripheral device, including a processor to calculate the amount of electrical energy required for said peripheral device to perform a task;
  a first task queue for said peripheral device that can be read to find at least one task for said peripheral device if it is determined that said electrical power is changing from said "on" state to said "off" state, said one task having been placed in said first task queue before it is determined that said electrical power is changing from said "on" state to said "off" state; and
  a non-volatile memory, including a second task queue for said peripheral device that can store data describing said task if insufficient electrical energy remains available to said peripheral device to complete said at least one task.

11. The data processing system of claim 10, further comprising:
  a read/write bus for reading a plurality of entries in said second task queue for at least one stored task, if said electrical power is changing from said "off" state to said "on" state;
  a circuit to start said peripheral device and retrieve said at least one stored task from said second task queue, if said at least one stored task is in said second task queue; and
  a task scheduler to initiate the performance of said at least one stored task with said peripheral device.

12. The data processing system of claim 10, further comprising an uninterruptible power supply externally connected to said peripheral device.

13. The data processing system of claim 10, wherein said electrical detection circuit is inside an uninterruptible power supply.

14. The data processing system of claim 10, wherein a processor to calculate said amount of energy required to perform said task is located outside said peripheral device.

15. The data processing system of claim 10, wherein said non-volatile memory includes a magnetic memory.

16. A data processing system, comprising:
  an uninterruptible power supply;
  a peripheral device operatively coupled to the uninterruptible power supply, wherein said peripheral device is connected to a circuit to detect a change in electrical power supplied to said uninterruptible power supply;
  a non-volatile memory operatively coupled to the peripheral device;
  a task queue in said non-volatile memory configured to contain one or more tasks for said peripheral device; and
  a processor to calculate the amount of energy required by said peripheral device to perform a scheduled task in said task queue in said non-volatile memory.

17. A method to handle a power interruption to a printer having an uninterruptible power supply, comprising:
  the printer receiving an indication that electrical power to the uninterruptible power supply has been interrupted;
  printing all print jobs in a print queue associated with the printer for which there is enough power available to print from the uninterruptible power supply; and
  saving to a non-volatile memory all print jobs in the print queue for which there is not enough power available to print from the uninterruptible power supply.

18. A printing system, comprising:
  an uninterruptible power supply;
  a printer operatively connected to the uninterruptible power supply;
  a print queue associated with the printer;
  a detection circuit operatively connected to the printer to detect an interruption in power supplied to the uninterruptible power supply; and
  a processor configured, in the event of an interruption in power supplied to the uninterruptible power supply, to direct the printer to print all print jobs in the print queue for which there is enough power available to print from the uninterruptible power supply; and
  save to a non-volatile memory all print jobs in the print queue for which there is not enough power available to print from the uninterruptible power supply.

* * * * *

UNITED STATES PATENT AND TRADEMARK OFFICE
CERTIFICATE OF CORRECTION

PATENT NO. : 6,996,746 B2 Page 1 of 1
APPLICATION NO. : 10/690188
DATED : February 7, 2006
INVENTOR(S) : Arti Shukla et al.

It is certified that error appears in the above-identified patent and that said Letters Patent is hereby corrected as shown below:

In column 6, line 9, in Claim 1, delete "state;" and insert -- state, --, therefor.

In column 6, line 11, in Claim 1, delete "task;" and insert -- task, --, therefor.

In column 6, line 14, in Claim 1, delete "task;" and insert -- task, --, therefor.

Signed and Sealed this

Second Day of June, 2009

JOHN DOLL
*Acting Director of the United States Patent and Trademark Office*